United States Patent [19]

Mirtain

[11] 4,407,347
[45] Oct. 4, 1983

[54] PNEUMATIC TIRE

[75] Inventor: Henri J. Mirtain, Compiegne, France

[73] Assignee: Pneu Uniroyal Englebert, Clairoix, France

[21] Appl. No.: 869,397

[22] Filed: Jan. 13, 1978

[30] Foreign Application Priority Data

Feb. 7, 1977 [FR] France ............................. 77 03378

[51] Int. Cl.³ .............................................. B60C 9/20
[52] U.S. Cl. .......................... 152/361 FP; 152/354 R; 152/361 R
[58] Field of Search ..... 152/361 R, 361 FP, 361 DM, 152/354 R, 357, 355, 356

[56] References Cited

U.S. PATENT DOCUMENTS

| | | | |
|---|---|---|---|
| 3,386,487 | 11/1968 | Massoabre | 152/361 DM |
| 3,500,890 | 3/1970 | Boileau | 152/361 FP |
| 3,543,828 | 12/1970 | Colombes | 152/361 R |
| 3,717,190 | 2/1973 | Boileau | 152/361 FP |
| 3,757,843 | 9/1973 | Carr | 152/361 FP |
| 3,973,612 | 8/1976 | Mezzanotte | 152/354 |
| 4,029,139 | 6/1977 | Abbott | 152/354 |
| 4,034,791 | 7/1977 | Mirtain | 152/361 P |

Primary Examiner—John J. Love
Assistant Examiner—L. E. Williams
Attorney, Agent, or Firm—Jack Posin

[57] ABSTRACT

A radial ply pneumatic tire is provided with a tread reinforcement including a first layer of at least one ply of tire cord fabric wherein the cords have a high modulus of elasticity. A second layer which overlies said first layer is at least one composite ply of tire cord fabric including a central strip of steel cords oriented at an angle of from 60° to 90° with the equatorial plane of the pneumatic tire, and two lateral strips abutting the central strip having cords formed from material possessing a low modulus of elasticity.

8 Claims, 3 Drawing Figures

PNEUMATIC TIRE

BACKGROUND OF THE INVENTION

1. Field of the Invention

This invention relates to pneumatic tires, and more particularly, to a radial ply pneumatic tire in which the tread is rigidified and stabilized by an annular reinforcement belt.

2. Prior Art

Since the advent of the radial tire, it has been recognized that to enhance the operational characteristics of the tire, an annular reinforcement is necessary between the tire tread and the radial body cords of the tire carcass.

It has been found that the annular reinforcement has marked effects on the tread wear, road traction, resistance to lateral thrust and comfort of ride. Major problems, however, accompany these advantages. One of paramount importance is the tendency of the bond between the cords in the annular reinforcement and the surrounding rubber composition to deteriorate during high operational speeds.

In an attempt to alleviate the above and other problems, many different reinforcement belt structures have been proposed. For example, a reinforcement belt structure including two plies which do not extend beyond the tread width and a narrow ply which lies between the belt structure and the tire carcass is disclosed in U.S. Pat. No. 3,386,487. Variations of this structure can be seen in U.S. Pat. No. 3,717,190, and U.S. Pat. No. 3,735,790. In addition to the structures described in these patents, other reinforcement belt constructions have been devised containing combinations of plies of tire cord fabric having cords of steel and aromatic polyamide.

While each of the reinforcement belt structures described in the above cited patents attempts to alleviate the problems inherent in the radial tire construction, none of these arrangements make it possible to simultaneously achieve a radial pneumatic tire having resistance to longitudinal stress, improved lateral regidity, improved structural integrity at elevated operation speeds, and improved immunity to reinforcement belt separation.

It is toward the elimination of these and other problems that the present invention is directed.

SUMMARY OF THE INVENTION

1. Purpose of the Invention

It is an object of the present invention to improve a radial ply tire in such a way that the tire has a higher resistance to longitudinal stress, has increased lateral rigidity, has increased resistance to deterioration of the reinforcing belt structure as the tire operates at high speeds, is light-weight, and is relatively inexpensive to manufacture.

Other objects of the present invention in part will be obvious and in part will become apparent as the description proceeds.

2. Brief Description of the Invention

Generally the above and other objects of the present invention are attained by a tire constructed in accordance with one embodiment of the present invention which is provided with a radial carcass and an annular tread reinforcement including a first layer of at least one ply of tire cord fabric having cords possessing a high modulus of elasticity. Each ply in the first layer may have a width substantially equal to that of the tire tread. A second layer is disposed between the first layer and the tread and includes at least one composite ply of tire and fabric. The composite ply has a central strip containing steel cords oriented at an angle from 60° to 90° with the equatorial plane of the tire. Two lateral strips abut the edges of the central strip and contain cords of synthetic material having a low modulus of elasticity, e.g., nylon, polyester, and cellulose acetate. The cords in the lateral strips may be arranged longitudinally, i.e., substantially parallel, to the equatorial plane of the tire. Furthermore, each lateral strip may have a width of between ¼ and the total width of the central strip.

According to another embodiment of the present invention, the cords in the plies forming the first layer are of an aromatic polyamide having a high modulus of elasticity in excess of 3,500 kg/sq. mm. or 260 g/denier. Further, the cords may lie at an angle of between about 15° and 25° with the equatorial plane of the tire.

In a further embodiment of the present invention, the first layer of the reinforcement belt includes two plies of tire cord fabric in which the cords are of aromatic polyamide with the ply disposed immediately adjacent the second layer having preferably a width slightly smaller than the other ply. For example, the width of this ply may be approximately 5 to 20% less in width. In this embodiment, the cords in the one ply of aromatic polyamide cord fabric may lie at an angle which is inverted on the equatorial plane to the angle of the cords in the other ply.

The invention consists of the features of construction and arrangement of parts which will be detailed hereinafter and described in the appended claims.

BRIEF DESCRIPTION OF THE DRAWINGS

While the specification concludes with claims particularly pointing out and distinctly claiming the subject matter regarded as the invention herein, it is believed that the invention will be better understood from the following description when read in conjunction with the accompanying drawings, in which:

DESCRIPTION OF THE PREFERRED EMBODIMENTS

As used in the following description, the term "cord" is used to designate both individual filaments spaced apart from one another within the tire fabric and a number of filaments assembled so as to constitute cables. In this context, one or more of the filaments may be arranged to form a strand, with each strand then being combined with other strands to form the cable. The strands may be arranged parallel to each other so as to form a web constituting the entire portion of, or part of, a ply. Further, the strands can be independent of each other or can constitute a weft cooperating with a knit fabric made of fine yarn or a wrap constituted by fine yarns which serve to maintain the respective spacings of the strands prior to their being coated with natural or synthetic rubber.

Figure 1:
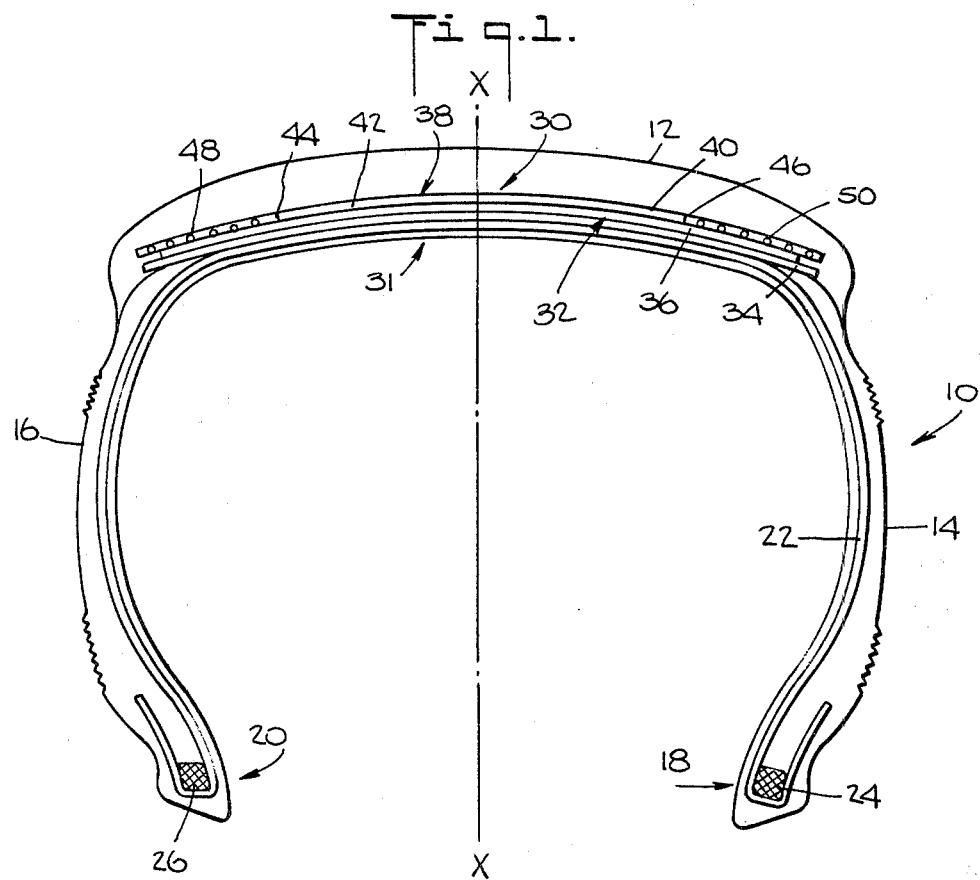
FIG. 1 is a view in radial section of a radial tire having a reinforcement belt in accordance with one embodiment of the present invention.

Referring now to the drawings, there is illustrated in FIG. 1, a pneumatic tire 10 which is formed with a grooved tread represented generally by the reference numeral 12 and two side walls 14 and 16 each of which terminates in a bead region 18 and 20 respectively. The bead portions 18 and 20 may of course be strengthened by flippers or other narrow plies of cord (not shown) which constructions are well known in the art.

Each side wall is reinforced by at least one ply of radial cords 22. The cords are radial in the sense that they run transversely from the bead 24 in the bead region 18 to the bead 26 in the bead region 20 in planes containing the axis of rotation of the tire. The ends of the radial cords are turned around the bead wires as shown.

The tread 12 is stabilized by an annular reinforcement belt in accordance with the present invention identified generally by reference numeral 30 in the crown region 31 of the tire. In accordance with one embodiment of the present invention, the reinforcement 30 includes a first layer 32 including two plies 34 and 36 of tire cord fabric and a second layer 38 including at least one composite ply 40 of tire cord fabric superimposed upon the first layer. The cords in each of the plies 34 and 36 are aromatic polyamides having a high modulus of elasticity in excess of 3,500 kg/sq. mm. or 260 g/denier and are oriented to form an angle alpha with the equatorial plane x—x of the tire 10 of between 15° and 25°. Preferably, the angle alpha is 20°. As shown in FIG. 1, the plies 34 and 36 may be stepped, i.e., ply 36 has a width 5 to 20% less than the width of ply 34.

As noted hereinabove, the second layer 38 includes at least one composite ply 40 including a central strip portion 42 having axial end faces 44 and 46 respectively. Positioned immediately adjacent and in abutting relationship to the central strip 42 along its axial faces 44 and 46 are lateral strips 48 and 50 respectively.

In the embodiment illustrated in FIG. 1, the widths of the lateral strips 48 and 50 are approximately between one quarter and the full width of the central strip 42.

The central strip 42 is of tire cord fabric in which the cords are steel and in which the cords lie at an angle beta of between 60° to 90° with the equatorial plane of the tire and preferably, lie at an angle of approximately 90°. The lateral strips 48 and 50 in this case, contain nylon cords arranged parallel to the equatorial plane of the tire.

Figure 2:
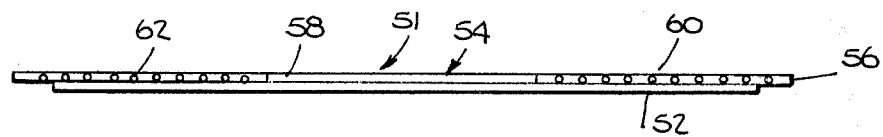
FIG. 2 is a radial sectional view of a reinforcement belt according to a second embodiment of the present invention.

There is illustrated in FIG. 2 a reinforcement belt 51 of an alternative construction which includes a first layer of one ply of tire cord fabric 52 in which the cords are of aromatic polyamide having superimposed thereon a second layer 54 of at least one composite ply 56. The composite ply 56 includes a central strip portion 58 and two lateral strip portions 60 and 62 which abut the central strip portion and which each have a width equal to the central strip portion. In this embodiment, the physical characteristics and cord orientations with regard to the ply 52 are identical to those of the plies 34 and 36, and with regard to the strips 58, 60 and 62 are identical to those of strips 42, 48 and 50 respectively. Alternatively, the cords in lateral strips 48 and 50 or strips 60 and 62 may be of polyester instead of nylon.

Figure 3:
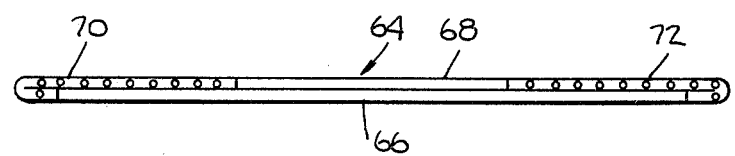
FIG. 3 is a radial sectional view of a reinforcement belt according to a third embodiment of the invention.

With reference to FIG. 3, a reinforcement belt in accordance with another alternative embodiment of the present invention is identified by the reference numeral 64 and includes a first layer having at least one ply 66 of tire cord fabric covered by a second layer of at least one composite ply 68 of a construction identical to the composite plies 40 and 54 but for the fact that the edges of the lateral strips 70 and 72 are folded over as shown.

As to the steel cords in the central strips 42 and 58, these can be formed from fine flat blades arranged side by side to one another with the blades having a thickness of 1 to 1.5 mm. and a width of several millimeters.

The steel cords that may be used in the practice of the present invention can be formed of strands made up of four wires, each having a diameter of 0.25 mm and arranged at the rate of 86 cables per linear decimeter. The nylon cords, arranged for instance at the rate of 105 cords per linear decimeter are each made up of two strands of 940 denier, whereas the cords made of aromatic polyamide are for instance strands made of aromatic polyamides known under the trademarks "Aramide" or "Kevlar," with each one being made up of three strands of 1670 denier, and being arranged at the rate of 83 strands per linear decimeter.

The advantages of the reinforcement belt described hereinabove are readily apparent. By designing the reinforcement belt so that there are at least two superimposed layers of tire cord fabric of aromatic polyamide cords in a first layer wherein the cords form an angle of from 10° to 25° with the equatorial plane of the tire, a high resistance to longitudinal stress is achieved. The presence in the second layer of a central strip of steel tire cord fabric in which the cords lie at an angle of between 60 to 90° with the equatorial plane of the tire gives the tire an increased lateral rigidity. Furthermore, due to the fact that the two lateral strips in the second layer contain strands of a synthetic material having a low modulus of elasticity wherein the strands are arranged preferably longitudinally in the reinforcement belt, i.e., parallel to the equatorial plane of the tire, a high resistance to deterioration during operation at high speeds, and in particular a high resistance to the detachment of the side edges of the reinforcement belt is achieved. In addition, because of the use of the aforementioned materials the tire is more comfortable riding, is relatively light in weight and relatively low in cost.

It can thus be seen that the objects of the present invention, namely, to provide an improved pneumatic tire are accomplished by a carcass composed of a casing having a pair of flexible sidewalls and a tread portion joined to and extending between the sidewalls and an annular reinforcement belt disposed between the casing and the tread. The reinforcement belt includes a first layer of at least one ply of tire cord fabric in which the cords possess a high modulus of elasticity, and a second layer superimposed upon the first layer including at least one composite ply between the first layer and the tire tread. The composite ply has a central strip of tire cord fabric in which the cords are steel strands forming an angle of between 60° and 90° with the equatorial plane of the tire and two lateral strips of tire cord fabric which abut the side edges of the central strip and which have cords made of material having a low modulus of elasticity.

While in accordance with the patent statutes preferred and alternative embodiments of the present invention have been described in detail, it is to be understood that the invention is not limited thereto or thereby.

What is claimed is:
1. A pneumatic tire comprising:
(a) a carcass;

(b) a tread portion connected to said carcass; and
(c) a reinforcement belt assembly peripherally enclosing said carcass beneath said tread portion and being substantially coextensive with said tread portion, said reinforcement belt including:
  (i) a first layer of at least one ply of tire cord fabric containing cords having a high modulus of elasticity, at least one ply of said first layer being of a width substantially equal to that of the tire tread; and
  (ii) a second layer of at least one composite ply superimposed upon said first layer, including a central strip portion of metal tire cord fabric in which the cords are oriented at an angle of between 60° to 90° with the equatorial plane of the pneumatic tire and two lateral strips of tire cord fabric which abut said central strip, the cords of said lateral strips possessing a low modulus of elasticity.

2. The pneumatic tire in accordance with claim 1 wherein said tire cord fabric comprising said lateral strips includes cords selected from the group consisting of nylon, polyester, and cellulose acetate.

3. The pneumatic tire in accordance with claim 1 wherein said cords in said lateral strips are parallel to the equatorial plane of said tire.

4. The pneumatic tire in accordance with claim 1 wherein said tire cord fabric in said first layer is an aromatic polyamide.

5. The pneumatic tire in accordance with claim 1 wherein said cords in said first layer are oriented at an angle of between 15° to 25° with the equatorial plane of said tire.

6. The pneumatic tire in accordance with claim 1 wherein said first layer includes two plies of aromatic polyamide tire cord fabric, and in which said ply adjacent said second layer is of a width approximately 5 to 20% less than the width of said other ply.

7. The pneumatic tire in accordance with claim 1 wherein each of said lateral strips has a width equal to between approximately one quarter and the full width of said central strip.

8. The pneumatic tire in accordance with claim 1 wherein said lateral strips are folded to abut said first layer.

* * * * *